(12) United States Patent
Muranaka et al.

(10) Patent No.: US 11,934,010 B2
(45) Date of Patent: Mar. 19, 2024

(54) OPTICAL CONNECTION STRUCTURE

(71) Applicant: Nippon Telegraph and Telephone Corporation, Tokyo (JP)

(72) Inventors: Yusuke Muranaka, Musashino (JP); Kota Shikama, Musashino (JP); Hidetaka Nishi, Musashino (JP); Ai Yanagihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 449 days.

(21) Appl. No.: 17/276,312

(22) PCT Filed: Oct. 8, 2019

(86) PCT No.: PCT/JP2019/039667
§ 371 (c)(1),
(2) Date: Mar. 15, 2021

(87) PCT Pub. No.: WO2020/080196
PCT Pub. Date: Apr. 23, 2020

(65) Prior Publication Data
US 2022/0035099 A1 Feb. 3, 2022

(30) Foreign Application Priority Data

Oct. 18, 2018 (JP) .................................. 2018-196692

(51) Int. Cl.
*G02B 6/30* (2006.01)
*G02B 6/36* (2006.01)

(52) U.S. Cl.
CPC .............. *G02B 6/30* (2013.01); *G02B 6/3652* (2013.01); *G02B 6/368* (2013.01)

(58) Field of Classification Search
CPC ......... G02B 6/30; G02B 6/3652; G02B 6/368
See application file for complete search history.

(56) References Cited

U.S. PATENT DOCUMENTS

2017/0219772 A1* 8/2017 Jiang ....................... C23C 14/18
2019/0033526 A1    1/2019 Hasegawa et al.

FOREIGN PATENT DOCUMENTS

| JP | 2004-205662 | A |   | 7/2004 |              |
| JP | 2004205662  | A | * | 7/2004 | ... G02B 6/30 |

(Continued)

OTHER PUBLICATIONS

Ingrid Moerman et al., *A Review on Fabrication Technologies for the Monolithic Integration of Tapers with III-V Semiconductor Devices*, IEEE Journal of Selected Topics of Quantum Electronics, vol. 3 No. 6, 1997, pp. 1308-1320.

(Continued)

*Primary Examiner* — Michael P Mooney
(74) *Attorney, Agent, or Firm* — Workman Nydegger

(57) ABSTRACT

There is provided an optical connection structure in which an optical fiber and an optical semiconductor waveguide are easily connected with low loss. The present invention relates to an optical connection structure configured to connect an optical waveguide device and an optical fiber including cores having different refractive indexes, wherein an optical connection component using a planar lightwave circuit is bonded and fixed on an end surface of an input/output waveguide of the optical waveguide device, a value of a refractive index of a core of the planar lightwave circuit is between a value of the refractive index of the core of the optical waveguide device and a value of the refractive index of the core of the optical fiber, and the optical waveguide device and the optical fiber are optically connected via the planar lightwave circuit.

6 Claims, 8 Drawing Sheets

(56) References Cited

FOREIGN PATENT DOCUMENTS

| | | |
|---|---|---|
| JP | 2005-300212 A | 10/2005 |
| JP | 2005-301301 A | 10/2005 |
| JP | 2014-126664 A | 7/2014 |
| JP | 2017-191214 A | 10/2017 |

OTHER PUBLICATIONS

Kei Watanabe et al., *Optical Waveguide Technology for Ultra-Compact and High-Density Integration*, NTT Technology Journal, vol. 28, No. 11, 2016, pp. 14-17.

* cited by examiner

1201

1202

OPTICAL CONNECTION STRUCTURE

TECHNICAL FIELD

The present invention relates to a connection method and a connection structure of an optical component that positions an optical fiber to be inserted in use for connecting the optical fiber and an optical waveguide on a board or in a package.

BACKGROUND ART

In recent years, there has been a demand for a significant increase in communication capacity within and between data centers in accordance with an increase in traffic consumed by individuals using video services or an increase in traffic consumed by corporations using IoTs, cloud services, and the like. To solve this problem, an optical interconnection technology using an optical transmission technology used in an optical communication has been introduced in place of a conventional short-distance communication method using electric signals. In a typical method of the optical interconnection, signal processing is achieved by transmission between a light emitting element such as a laser diode (LD) and a light receiving element such as a photo diode (PD) arranged on a printed circuit board using an optical transmission medium such as an optical waveguide or an optical fiber. In some transmission methods, a light modulating element or the like is integrated with or discretely connected to a light emitting element, and further a driver or the like for converting electricity to light is connected thereto, so that these components are mounted on a printed circuit board as an optical transmitter. Similarly, an optical processor or the like is appropriately integrated with or discretely connected to a light receiving element, and further an electric amplifier circuit for converting light to electricity is connected thereto, so that these components are mounted on a printed circuit board as an optical receiver. An optical transceiver or the like obtained by integrating the optical transmitter and the optical receiver is mounted in a package or on a printed circuit board and is optically connected to an optical transmission medium such as an optical fiber, thereby achieving the optical interconnection. Further, the optical interconnection is achieved via a repeater such as an optical switch in some topologies.

As the light emitting element, the light receiving element, and the light modulating element, semiconductors such as silicon and germanium and III-V group semiconductors represented by indium phosphide (InP), gallium arsenide (GaAs), indium gallium arsenide (InGaAs), and the like have been put into practical use, and optical transceivers of an optical waveguide type in which a silicon optical circuit or an indium phosphor optical circuit having a light propagating mechanism is integrated with these elements have been developed recently. In addition to the semiconductors, a ferroelectric material such as lithium niobate, a polymer or the like may be used for the light modulating element. Further, an optical functional element including a planar lightwave circuit (hereinafter referred to as PLC) or the like made of quartz glass or the like is also integrated with the light emitting element, the light receiving element, and the light modulating element. Examples of the optical functional element include a splitter, a wavelength multiplexer/demultiplexer, an optical switch, a polarization control element, and an optical filter. Hereinafter, the above-described light emitting element, light receiving element, light modulating element, optical functional element, optical amplification element, and the like having a light propagating and waveguiding mechanism are collectively and simply referred to as an optical waveguide device (an optical semiconductor waveguide device).

The optical waveguide device is typically connected to an optical fiber array integrated with glass or the like provided with a V groove. This connection requires that each core of optical fibers and each core of optical waveguides be connected with low loss. Thus, it is necessary to position (hereinafter, align) and fix the optical waveguide device and the fibers in submicron units. The conventional optical waveguide device is aligned and integrated with the optical fiber array, and the optical waveguide device integrated with the optical fiber array is mounted in the package or on the board. However, the handling of the optical fibers is complicated, and thus it is necessary to easily align and fix the optical waveguide device and the optical fibers in the package or on the board.

CITATION LIST

Non Patent Literature

Non Patent Literature 1: Ingrid Moerman et al., "A Review on Fabrication Technologies for the Monolithic Integration of Tapers with III-V Semiconductor Devices," IEEE Journal of Selected Topics in Quantum Electronics, 1997, vol. 3, no. 6, p. 1308.

SUMMARY OF THE INVENTION

Technical Problem

An optical semiconductor material is essential to fabricate the light emitting element and the light receiving element, and the connection between the optical semiconductor waveguide and the optical fiber or other optical waveguide devices is important to achieve the optical interconnection. In the optical semiconductor waveguide using a semiconductor having a high refractive index, a strong optical confinement having a large difference in the refractive index between the core and the clad is used. This enables a waveguide with low loss regardless of a small bending radius, thereby achieving a small optical circuit. However, the optical semiconductor waveguide having a large difference in the refractive index between the core and the clad has a smaller mode size than that of a common optical fiber and generates large coupling loss during optical coupling.

To achieve the optical coupling with low loss, there is proposed a method of allowing the spot diameter of the optical fiber to be close to the optical semiconductor waveguide using a spherical fiber or a high numerical aperture (hereinafter referred to as NA) fiber. When the optical fiber and the optical semiconductor waveguide are aligned and positioned optimally (hereinafter, referred to as optical alignment), the optical coupling can be performed with low loss. However, the tolerance during the alignment is very narrow and optical alignment in the package or on the board is very difficult.

On the other hand, to make the mode size of the optical semiconductor waveguide closer to the mode size of the optical fiber, a countermeasure to increase the mode size by introducing a spot-size converter (hereinafter referred to as SSC) on the input/output end surface of the optical waveguide has been examined as described in Non Patent Literature 1. Although a technique for increasing the spot diameter of the optical semiconductor waveguide using SSCs in various forms has been achieved, it is still insufficient to connect the optical semiconductor and the optical fiber having a large difference in the refractive index of the core of the waveguide, which causes loss during optical coupling.

Further, because the optical waveguide device is required to be a device in which various functions are integrated, the number of the input/output waveguides is large, and hence a technique for collectively connecting a plurality of waveguides is also required. In connecting the optical waveguide device and the optical fiber in the package or on the board, one challenge is to optically align the plurality of waveguides, and how large the tolerance is during the alignment is an important point.

The present invention has been made in view of the above-described problems and an object of the present invention is to provide an optical connection structure in which an optical fiber and an optical semiconductor waveguide are easily connected with low loss in a package or on a board.

Means for Solving the Problem

According to an aspect of the present invention, there is provided an optical connection structure for connecting an optical waveguide device and an optical fiber including cores having different refractive indexes, wherein an optical connection component using a planar lightwave circuit is bonded and fixed on an end surface of an input/output waveguide of the optical waveguide device, a value of a refractive index of a core of the planar lightwave circuit is between a value of the refractive index of the core of the optical waveguide device and a value of the refractive index of the core of the optical fiber, and the optical waveguide device and the optical fiber are optically connected via the planar lightwave circuit.

Effects of the Invention

The optical waveguide device and the optical fiber are connected via the planar lightwave circuit and the value of the refractive index of the core of the planar lightwave circuit is set between the value of the refractive index of the core of the optical waveguide device and the value of the refractive index of the core of the optical fiber, so that the optical fiber and the optical semiconductor waveguide can be easily connected with low loss.

DESCRIPTION OF EMBODIMENTS

Figure 1:
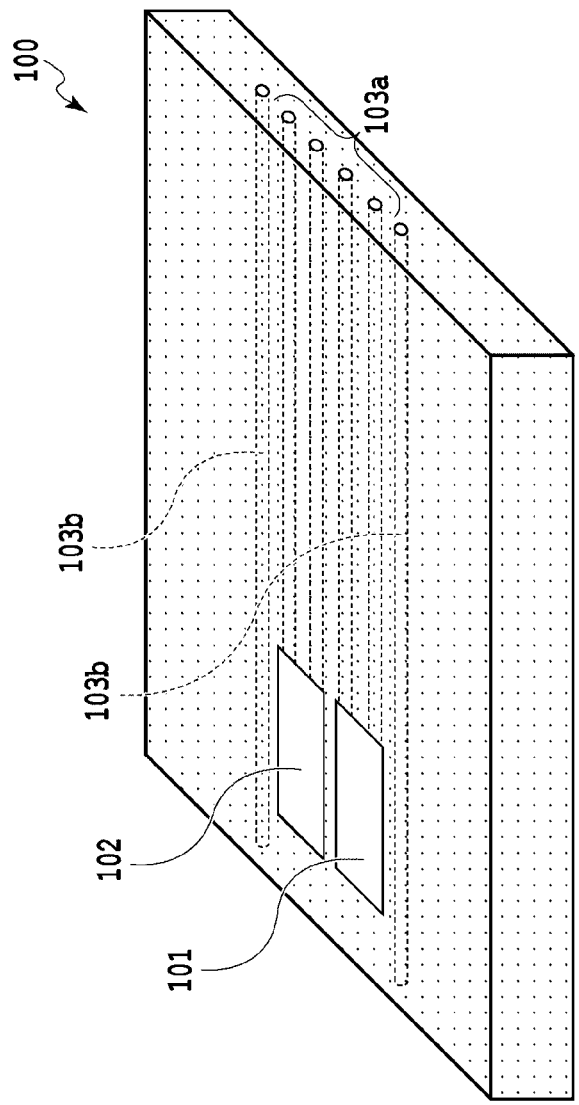
FIG. 1 is a diagram illustrating an optical waveguide device which is a part of an optical connection structure according to a first embodiment of the present invention.

Embodiments of an optical connection structure of the present invention will be described with reference to the drawings. However, it is obvious to those skilled in the art that the present disclosure is not limited to the description of the embodiments described below, and the mode and the detail thereof can be modified in various ways without departing from the spirit of the disclosure in this specification and the like. Further, configurations according to different embodiments can be implemented appropriately in combination. Additionally, in the configurations of the present invention described below, the same parts or parts having the same functions will be denoted by the same reference numerals and repetitive description thereof will be omitted in some cases.

First Embodiment

Hereinafter, a first embodiment of the present invention will be described with reference to the drawings. As illustrated in FIG. 1, an optical waveguide device 100 has a structure in which a one-dimensional waveguide array is provided on the optical axis, and a transmitter array 101, a receiver array 102, and the like are integrated on one chip. For example, the light emitting element is an integrated light emitting element in which a plurality of distributed feedback laser diodes (DFB-LD) made of InP are prepared and these are separately optically connected to a silicon waveguide, a glass waveguide, or the like. Alternatively, the light emitting element is a light emitting element in which the DFB-LD array adheres to a Si substrate and is integrated with a Si waveguide. Alternatively, the light emitting element is an integrated light emitting element in which an InP material or the like adheres to a Si substrate to form a laser layer, and a Si waveguide or a waveguide made of a Si oxide or the like (silicon oxide or silicon oxynitride film) is integrated. Similarly, as described in the background, the light receiving element may be an integrated light receiving element in which a PD made of indium gallium arsenide, germanium, or the like is integrated by adopting an adhering technique and separately optically connecting the PD to another waveguide device as in the example of the light emitting element. Further, an external modulating element may be appropriately separately connected to the light emitting element, or the light emitting element may be integrated on the same material. For example, the light emitting element may be integrated with a modulating element including a Si waveguide and a thermo-optical switch or an electro-optical switch, a modulating element including an InP waveguide and a thermo-optical switch or an electro-optical switch, or a modulating element made of a ferroelectric material such as LN. Further, a function of the modulating element or a direct modulation function such as an electric field absorption effect may be directly integrated/formed on the light emitting element. In the drawings, the modulating element is omitted. Of course, the specific layout of the optical waveguide is not limited thereto. As long as the optical waveguide device as described in the background is used, the optical waveguide device is not limited to the above.

Figure 2:
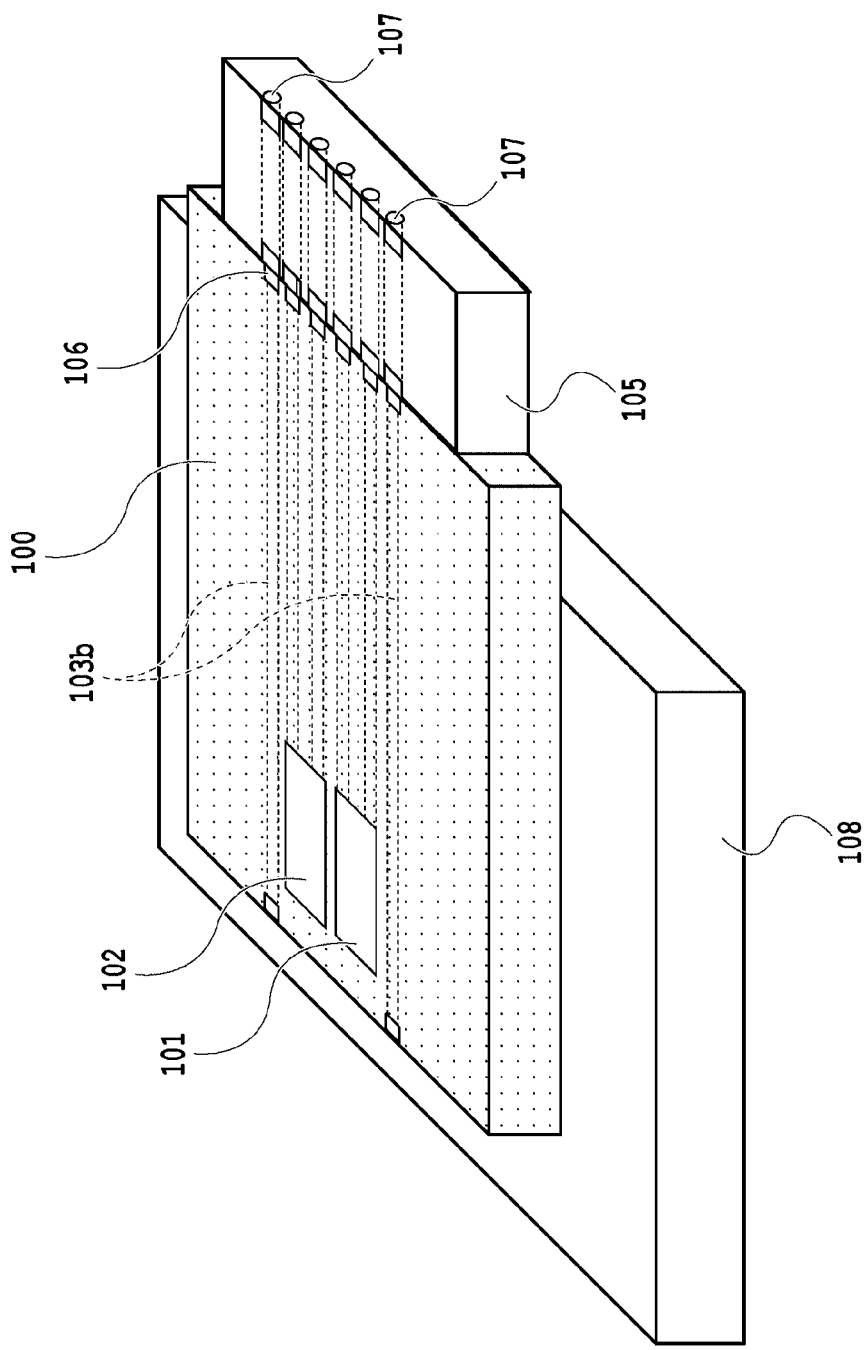
FIG. 2 is a diagram illustrating the optical waveguide device according to the first embodiment of the present invention and its optical connection structure.

FIG. 2 illustrates the optical waveguide device 100 according to the first embodiment of the present invention and its optical connection structure. A structure based on an optical waveguide in which Si on a Si substrate is a core of a waveguide and $SiO_2$ is a clad of the waveguide is assumed. From the waveguide array on the end surface of the optical waveguide device 100, input/output waveguides 103a which are optical waveguides other than alignment waveguides 103b are connected to the transmitter array 101 and the receiver array 102, and a PLC 105 is bonded and fixed on the end surface of the waveguide array. The chip is electrically connected on an electronic board 108 or the like, so that a transceiver for optical interconnection is configured. Further, an optical fiber array is connected to the other end surface of the PLC 105, so that the optical coupling between the optical fibers and the optical waveguides is achieved. Additionally, as described above, any method may be used in terms of the number of channels, the configuration, the material, the integration method, and the like in the light emitting element, the light receiving element, the light modulating element, the optical functional element, and the optical amplification element on the optical waveguide device 100.

A core with a high dopant concentration is used for the PLC 105. For example, those who carry out the embodiment adopt a core having a refractive index between the refractive index of the core of the Si optical waveguide of the optical waveguide device 100 and the refractive index of the optical fiber connected to the input/output waveguide 103a via the PLC 105. This enables a stepwise optical connection and achieves optical coupling with low loss.

Figure 3:
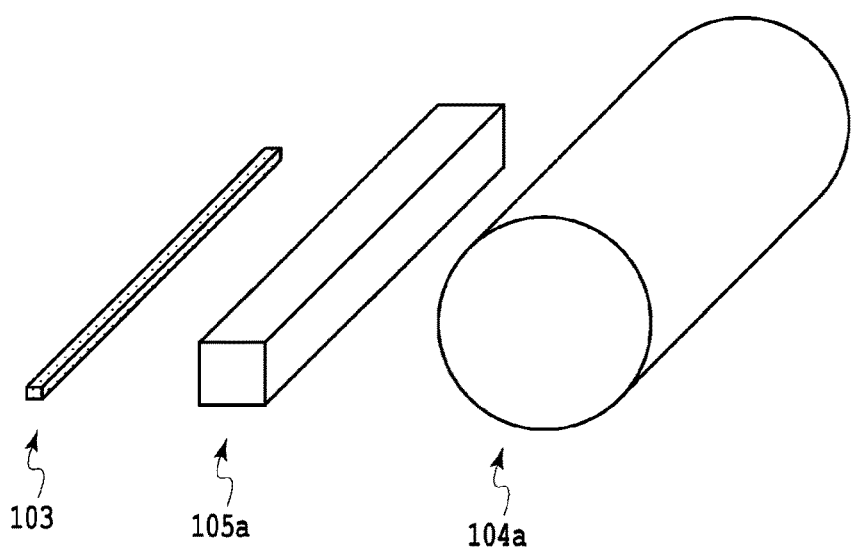
FIG. 3 is a diagram illustrating a comparative example of the sizes of a core of an optical waveguide, a core of a PLC, and a core of an optical fiber.

FIG. 3 illustrates a schematic comparative example of the sizes of a core 103 of the optical waveguide, a core 105a of the PLC, and a core 104a of the optical fiber.

Because the end surface of the array waveguide of the PLC 105 has an NA with a refractive index lower than that of the Si waveguide, the connection is easily performed. Further, the tolerance of alignment is widened during optical alignment, and the connection is easily performed by introducing an SSC 106 at the input/output of each Si waveguide and the PLC 105.

Figure 12A:
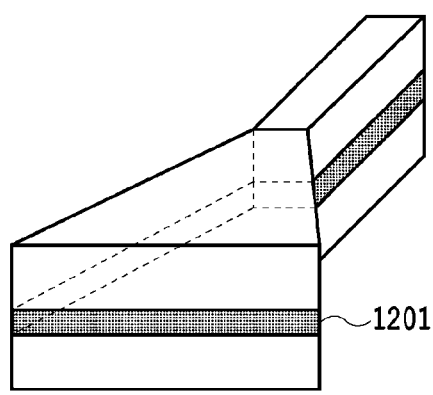
FIG. 12 is a diagram illustrating typical examples of an SSC.
Figure 12B:
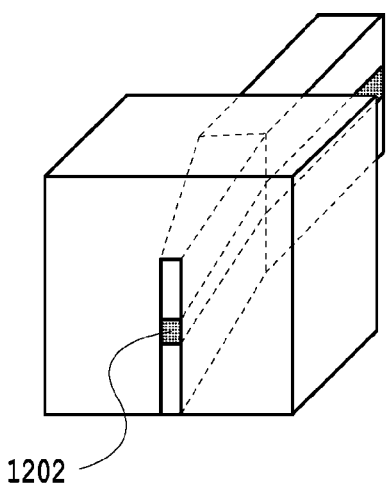

FIG. 12 illustrates typical examples of the SSC. As illustrated in FIG. 12, any structure can be applied as long as the SSC increases the mode. For example, the width of the core 1201 is simply widened in a tapered shape (FIG. 12(a)), or leakage into the clad is increased by an embedded structure in which the width of the core 1202 is narrowed (see FIG. 12(b)). Further, mode conversion of the waveguide becomes easier by adopting a high NA optical fiber instead of an optical fiber having a normal core diameter. In the case of a single mode, the core of the optical fiber 104 connected to the PLC 105 may have a portion having a core diameter smaller than 10 μm.

Figure 4:
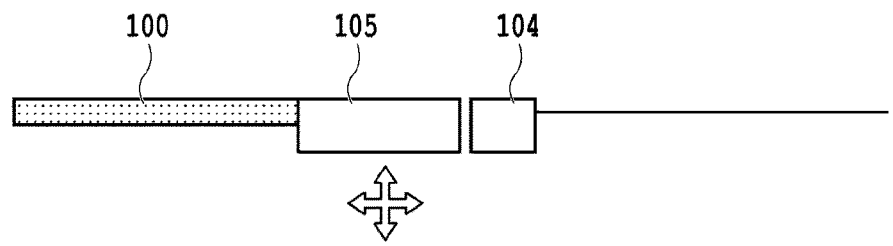
FIG. 4 is a diagram illustrating a state in which the optical waveguide device and the optical fiber are optically coupled via the PLC.
Figure 5:
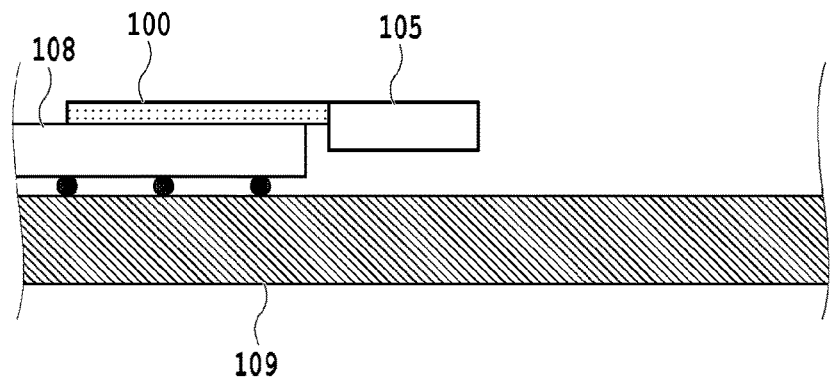
FIG. 5 is a diagram illustrating a state in which the optical waveguide device connected to the PLC is mounted.

A process of optically coupling the optical waveguide device 100 and the optical fiber 104 will be described with reference to the drawings. First, to position and fix the optical waveguide device 100 and the PLC 105 as illustrated in FIG. 4, optical alignment is performed by inserting light into alignment waveguides 107 using the optical fiber array. As illustrated in FIG. 5, the alignment is completed at a position where the light coupling loss is minimized, and the optical waveguide device 100 and the PLC 105 are bonded and fixed to each other.

Figure 6:
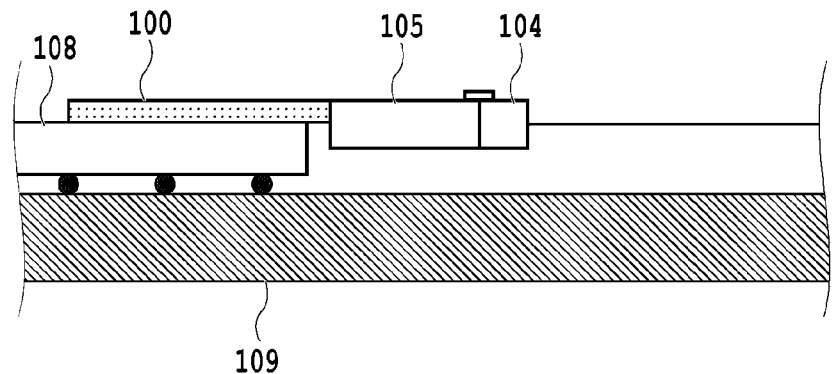
FIG. 6 is a diagram illustrating a state in which the optical waveguide device connected to the optical fiber via the PLC is mounted.

After these components are mounted in the package 109 or on the electronic board 108 as illustrated in FIG. 6, the PLC 105 and the optical fiber 104 are optically connected. The optical alignment is also performed at this time by using the alignment waveguides 107, and the PLC 105 and the optical fiber array having the optical fiber 104 are bonded and fixed at a position where the light coupling loss is minimized.

Through the above-described process, it is possible to obtain the optical connection structure for connecting the optical waveguide device 100 and the optical fiber 104 including cores having different refractive indexes. In the optical connection structure, the optical connection component using the PLC 105 is bonded and fixed on the end surface of the input/output waveguide 103a of the optical waveguide device 100, the value of the refractive index of the core of the PLC 105 is between the value of the refractive index of the core of the optical waveguide device 100 and the value of the refractive index of the core of the optical fiber 104, and the optical waveguide device 100 and the optical fiber 104 are optically connected via the PLC 105.

Figure 7:
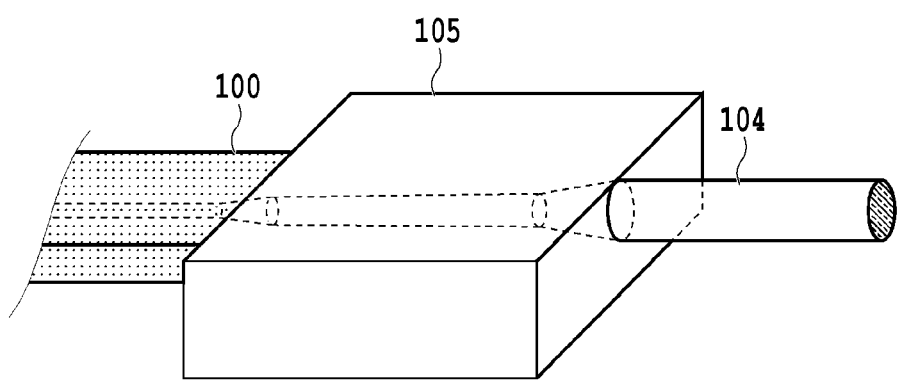
FIG. 7 is a diagram illustrating a state in which the optical waveguide device and the optical fiber are optically connected via the PLC.

As described above, as illustrated in FIG. 7, the connection between the optical waveguide of the optical waveguide device 100 and the PLC 105 and the connection between the PLC 105 and the optical fiber 104 are performed in a stepwise manner, which can reduce the difference in the refractive index between the optical waveguides to be connected, and hence obtain the effect of reducing optical coupling loss. Further, the PLC 105 and the optical fiber 104 are connected to each other at the time of the optical connection to the optical fiber 104 on the optical waveguide or the electronic board 108. Thus, the tolerance during optical alignment can be enlarged compared to the optical semiconductor waveguide, and hence the optical connection is easily performed.

Second Embodiment

Figure 8:
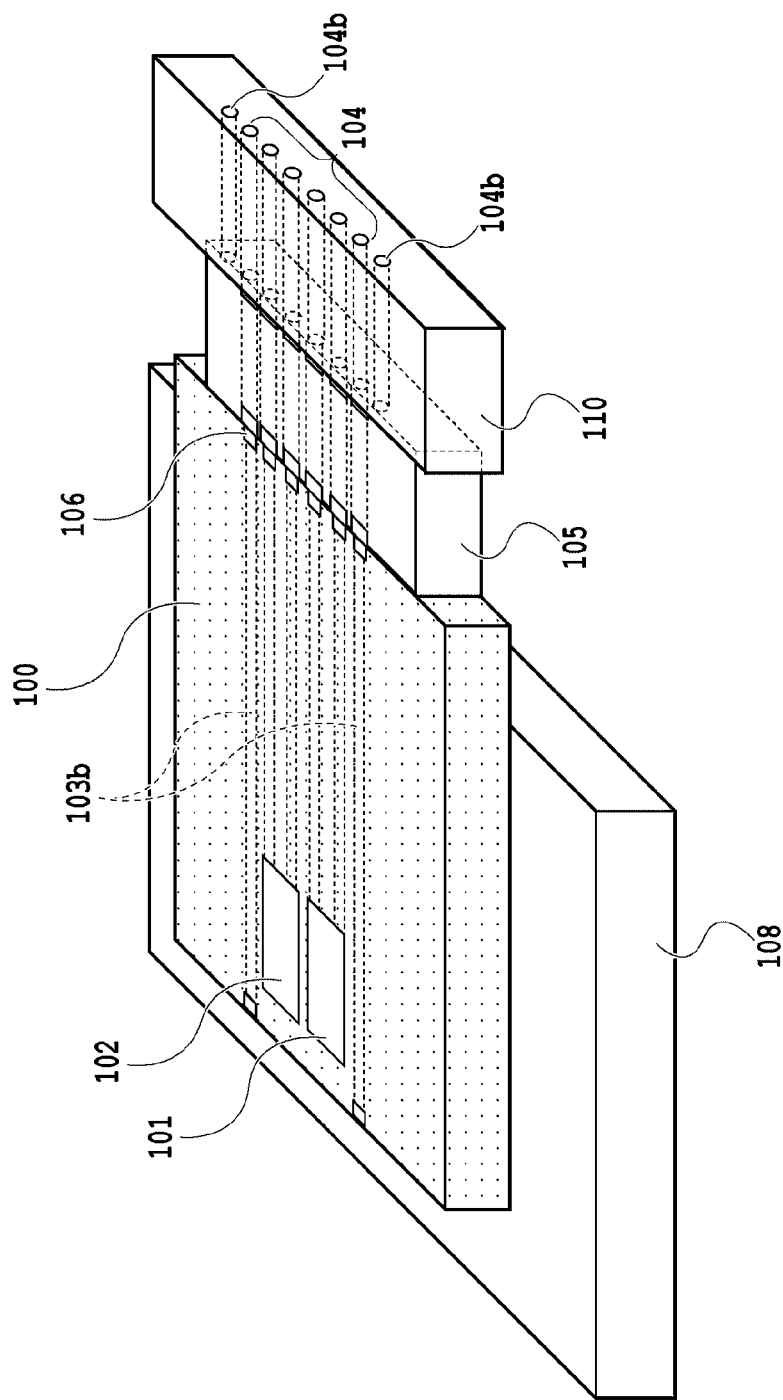
FIG. 8 is a diagram illustrating an optical waveguide device according to a second embodiment of the present invention and its optical connection structure.

FIG. 8 illustrates an optical waveguide device 100 according to a second embodiment of the present invention and its optical connection structure. The optical waveguide device has the same basic configuration as that of the first embodiment, but a method of connecting the optical fiber array is changed.

To easily connect the optical fiber in the package 109 or on the electronic board 108 after the optical waveguide device 100 and the PLC 105 are bonded and fixed to each other as in the first embodiment, an optical fiber guide component 110 is bonded and fixed on the other end surface of the PLC 105 in advance.

Figure 9:
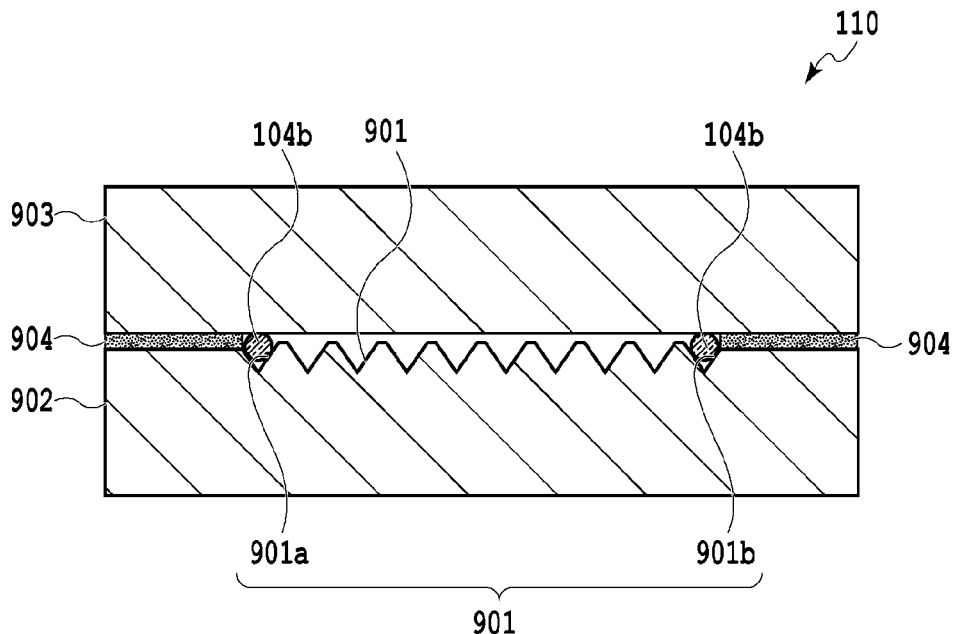
FIG. 9 is a diagram illustrating a cross-section of an optical fiber guide component.
Figure 10:
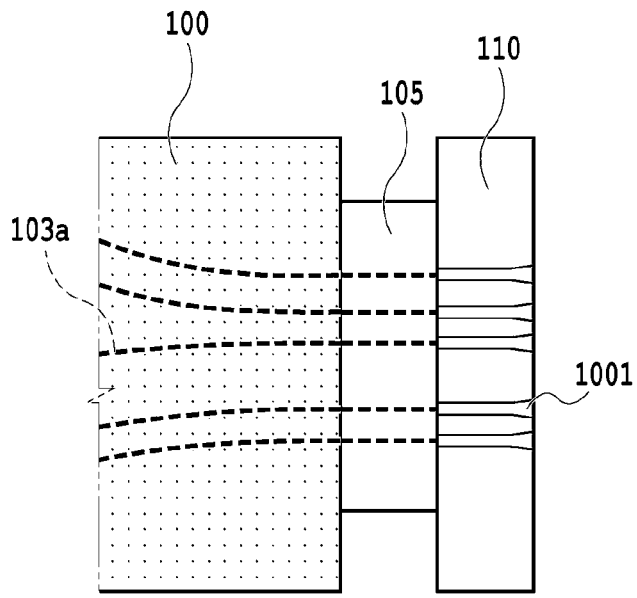
FIG. 10 is a diagram illustrating the optical waveguide device according to the second embodiment of the present invention and its optical connection structure.

As described in FIG. 9, the optical fiber guide component 110 includes a component of a substrate 902 provided with a V-shaped groove 901 such as a V-shaped groove a 901a and a V-shaped groove b 901b, a component of a lid (cover) 903 having a flat plate shape and pressing on the component of the substrate 902, a dummy fiber 104b for controlling a hole diameter, and an adhesive layer 904 integrating the component of the lid 902 and the component of the lid 903. These are integrated with the optical waveguide device 100 via the PLC 105 by an adhesive or the like as in FIG. 10. The optical fiber guide component 110 is connected to the PLC 105 in advance, so that the input/output waveguide 103a of the optical waveguide device 100 can be connected to the optical fiber 104 just by inserting the optical fiber 104 into a guide hole 1001 of the optical fiber guide component 110 in performing the optical connection in the package 109 or on the electronic board 108. Thus, the optical connection can be more easily performed.

Third Embodiment

Figure 11:
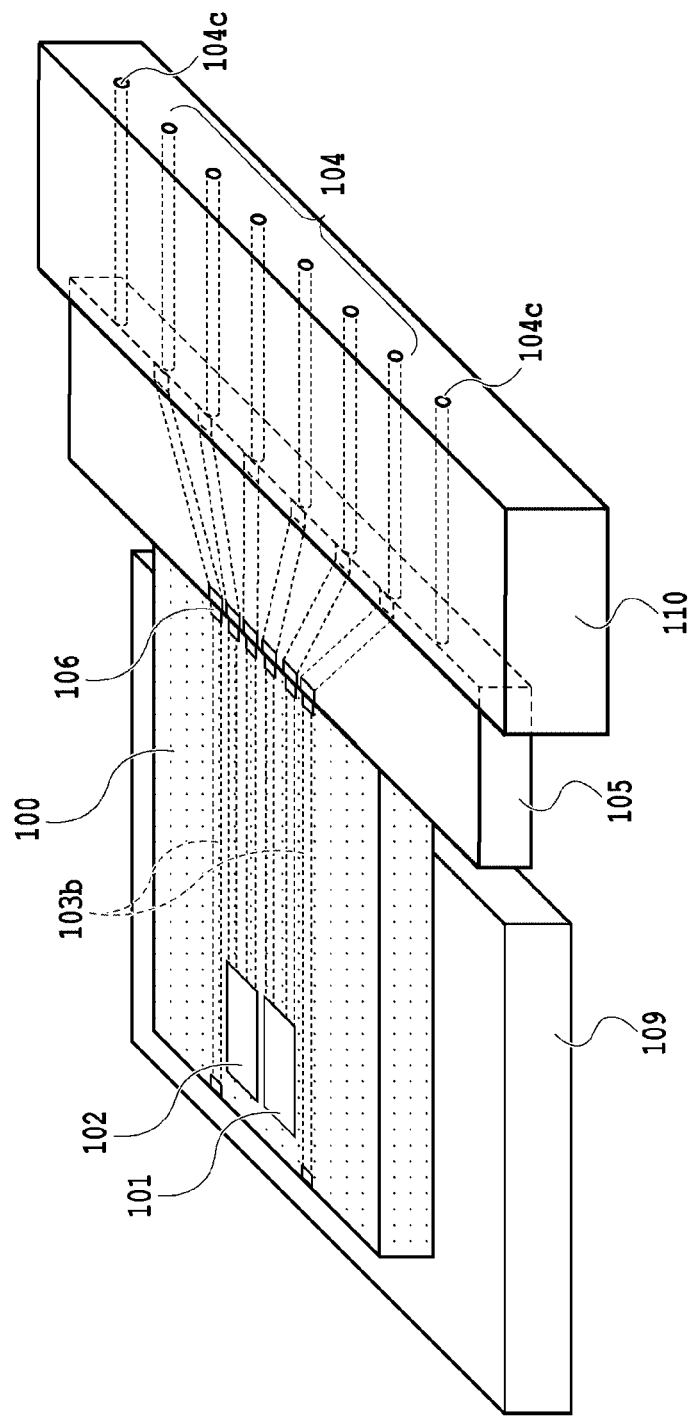
FIG. 11 is a diagram illustrating an optical waveguide device according to a third embodiment of the present invention and its optical connection structure.

FIG. 11 illustrates an optical waveguide device 100 according to a third embodiment of the present invention and its optical connection structure. The optical waveguide device has the same basic configuration as that of the second embodiment, but the input/output waveguide pitch is changed in the optical circuit using the PLC 105. Thus, it is possible to adapt to the optimum structure of each optical device to be connected. The optical connection structure includes the optical fiber array in which the optical fiber is provided in the groove of the substrate and the PLC 105 which adjusts the pitch of the input/output waveguide 103a of the optical waveguide device 100 and the pitch of the optical fiber 104. The PLC has a plurality of cores, and the longitudinal directions and the lengths of the plurality of cores are different from each other, so that the pitch of the input/output waveguide 103a and the pitch of the optical fiber 104 are set. The optical connection structure is characterized in that the pitch of the input/output waveguide 103a is narrower than the pitch of the optical fiber 104. In manufacturing the optical connection structure, the dummy fibers 104b, which are outer optical fibers 104, can be used.

For example, in the optical semiconductor waveguide device, because the core of the waveguide has a high refractive index, a circuit can be formed in a small area. Accordingly, it is desirable to manufacture an output waveguide array with a narrow pitch, but there is a limit in making the pitch of the optical fiber array narrow because the commercially available optical fiber has a specified cladding diameter. It is necessary to widen the pitch of the optical semiconductor waveguide array in conformity with the pitch of the optical fiber array. However, this is not preferable, because most optical semiconductor waveguides have relatively large propagating loss and a loss increases.

In this embodiment, the pitch of the waveguide array is changed in the PLC. Specifically, a plurality of cores are provided in the waveguides, and the plurality of cores have different directions and lengths in the longitudinal direction, thereby achieving low propagating loss. As a result, this embodiment exerts an effect in which the optical coupling can be performed with low loss.

INDUSTRIAL APPLICABILITY

The present invention is applicable to a technology relating to an optical connection component for connecting an optical fiber to an optical component.

REFERENCE SIGNS LIST

100 Optical waveguide device
101 Transmitter array
102 Receiver array
103 Core of optical waveguide
103a Input/output waveguide (optical waveguide)
103b Alignment waveguide
104 Optical fiber
104a Core of fiber
104b Dummy fiber
104c Dummy fiber
105 PLC
105a Core of PLC
106 SSC
107 Alignment waveguide
108 Electronic board
109 Package
110 Optical fiber guide component
901 Groove
901a Groove a
901b Groove b
902 Substrate
903 Lid
904 Adhesive layer
1001 Guide hole
1201 Core
1202 Core

The invention claimed is:

1. An optical connection structure configured to connect an optical waveguide device and an optical fiber, comprising:
an optical connection component using a planar lightwave circuit bonded and fixed on an end surface of an input/output waveguide of the optical waveguide device,
a value of a refractive index of a core of the planar lightwave circuit is between a value of the refractive index of the core of the optical waveguide device and a value of the refractive index of the core of the optical fiber, wherein a first spot-size converter is on a first end surface of an input/output waveguide of the planar lightwave circuit and a second spot-size converter is on a second end surface of the input/output waveguide of the planar lightwave circuit, and
the optical waveguide device and the optical fiber are optically connected via the planar lightwave circuit.

2. The optical connection structure according to claim 1, further comprising:
a third spot-size converter on the end surface of the input/output waveguide of the optical waveguide device.

3. The optical connection structure according to claim 1, wherein in a case of a single mode, the core of the optical fiber connected to the planar lightwave circuit includes a portion having a core diameter smaller than 10 μm.

4. The optical connection structure according to claim 1, wherein an optical fiber guide component including a guide hole for positioning the optical fiber is bonded and fixed on an input/output end surface of the planar lightwave circuit, the input/output end surface of the planar lightwave circuit on which the optical fiber guide component is bonded and fixed being different from the input/output end surface of the planar lightwave circuit on which the optical waveguide device is bonded and fixed.

5. The optical connection structure according to claim 1, further comprising:
an optical fiber array in which the optical fiber is provided in a groove of a substrate; and
the planar lightwave circuit which adjusts a pitch of the input/output waveguide of the optical waveguide device and a pitch of the optical fiber,
wherein the planar lightwave circuit includes a plurality of the cores, and the plurality of the cores have different longitudinal directions and lengths, so that the pitch of the input/output waveguide and the pitch of the optical fiber are set.

6. The optical connection structure according to claim 1, wherein the pitch of the input/output waveguide is narrower than the pitch of the optical fiber.

* * * * *